United States Patent Office 3,020,651
Patented Feb. 13, 1962

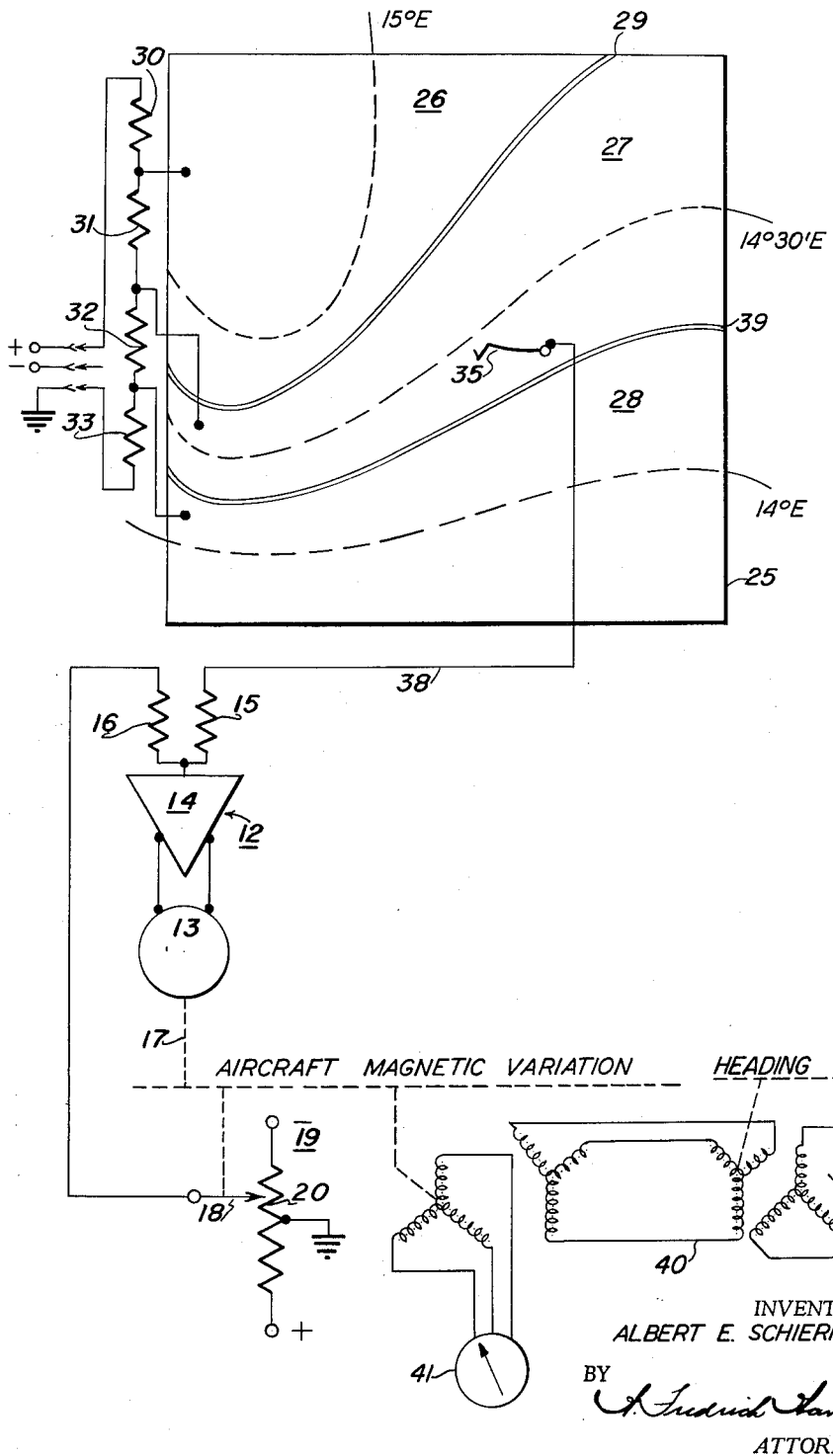

3,020,651
AUTOMATIC MAGNETIC DEVIATION EFFECTS
IN FLIGHT SIMULATORS
Albert E. Schierhorst, Beltsville, Md., assignor to ACF
Industries, Incorporated, New York, N.Y., a corporation of New Jersey
Filed May 18, 1959, Ser. No. 813,867
5 Claims. (Cl. 35—12)

This invention relates to an aircraft simulator and, more particularly, to a system for use in an aircraft flight simulator which provides a means of continuously and automatically simulating the effects of terrestrial magnetic deviation during simulated flight.

This system simulates in a realistic manner the magnetic deviation that exists at different geographical points at various simulated aircraft positions. The deviation, of course, changes as the aircraft changes its geographical location. The system described herein is continuous, automatic, and finds its preferred use in a flight simulator where a magnetic compass is provided.

In prior-art devices, magnetic deviation effects were fixed at the radio station location. If the flight simulator operator wished to introduce a change in the magnetic effect observed by the pilot during flight, he would make small changes to the setting of the station deviation control. This would produce changes in both the magnetic and radio compass indications and also require the operator's attention to the assigned magnetic deviation on isogonic lines which are published on sectional aeronautical charts and the like. Simulation of this effect, by the prior art method is unrealistic and bothersome.

Summarily stated, this invention provides a magnetic deviation system for use in a flight simulator which automatically introduces into the magnetic compass reading the proper degree of magnetic deviation according to a derived input signal from a programmed deviation card. Each card is scaled to the physical limits of the flight simulator plotting board and carries a contact which is positionable in agreement with the aircraft geographical position on the board. The various deviation cards are made up to represent the actual magnetic deviation that exists at each flight area simulated and are plug-in units to produce the deviation encountered in that area. The voltages derived from the card cause the magnetic selsyn device to take a position representing the aircraft heading as affected by the actual magnetic deviation.

It is, accordingly, a broad object of this invention to improve on the flight simulators now known.

It is a further and more distinct object of this invention to provide in a flight simulator having a magnetic compass system to derive voltages representing the magnetic deviation during the simulated flight and to rotate the indicator of the magnetic compass in accordance with aircraft heading and magnetic deviation during the simulated flight.

It is a specific object of this invention to provide a plotting board having a plurality of conductive segments shaped to represent respective magnetic deviation areas and a circuit connected to the segments to rotate the indicator of the compass to thereby apply the magnetic deviation during simulated flight.

The novel features of the invention are set forth in the appended claims and the invention as to its organization and its mode of operation will best be understood from a consideration of the following detailed description of the preferred embodiment when used in connection with the accompanying drawing which is hereby made a part of the specification and in which:

The single figure is a schematic wiring diagram of an aircraft simulator magnetic variation system in accordance with this invention.

Flight recording mechanisms for simulators are well known in the art, and comprise a computer for providing data in a form of derived voltages which represent the heading of an aircraft, such voltages being used to drive a servo motor which positions a shaft known as the heading shaft. It is customary to drive a resolver from the heading shaft and to introduce into the resolver from the computer a voltage representing the velocity of simulated flight. The output, then, of the resolver is in the form of voltages representing the components of velocity in two dimensions, usually east and north. A plotting board is driven from these voltages and a pen or indicator travels across the surface of the plotting board to reveal to the instructor the position of the aircraft, and usually to trace a line upon the chart to indicate the path of flight. All of the foregoing being well known. A synchro device is also driven from the heading shaft, such device having the form of a three-phase winding and being used to drive the movable element of the magnetic compass.

Referring now to the drawing, reference character 10 indicates the synchro receiver from the heading shaft 40 which is driven by the computer 42 which may be of any well known type, one example of which is shown in FIG. 3 of U.S. Patent 2,731,737 of R. G. Stern. The reference character 11 indicates a transmitter which is connected to the aircraft magnetic compass dial 41 which may be of any well known type, one example of which is illustrated in FIG. 2 of U.S. Patent 2,445,673 to K. A. Kail. A servo system designated generally by 12 consists of a motor 13, an amplifier 14, and input resistances 15 and 16 respectively. The output shaft is designated by reference character 17 and it will be seen that the output shaft drives wiper 18 of a potentiometer 19 having a resistance winding 20 and is also connected to transmitter 11.

A board 25 having a series of metallic segments 26, 27 and 28 mutually insulated from each other as by insulating strips 29 and 39 has the segments shaped to represent geographical areas in which the magnetic deviation is uniform. Stated differently, the isogonic lines, which may be defined as imaginary lines joining places on the surface of the earth at which the variation of the magnetic north from the meridian or true north is the same, are presumed to lie within the segment as there shown, for example, in the drawing the deviation amounting to 15° E is represented by segment 26; and deviations representing 14° 30″ E is represented by segment 27 and so on. A potential divider consisting of resistors 30 and 31 and 32 and 33 connected in series from a source of voltage applies respectively different voltages to the segments as there shown. A wiper 35 is connected to input resistor 15 by conductor 38 and is mechanically connected to the main flight plotting board so that as the indicating member of the plotting board moves, it mechanically moves wiper 35 with it.

Having in mind the fact that the synchro device partially shown by reference characters 10 and 11 is used to drive the magnetic compass dial as the simulated flight progresses and that the wiper 35 is driven from the main simulator plotting board, then the operation of this device is as follows: If wiper arm 35 were not in contact with metallic segment 27, which would be the effect of having this invention not present in the simulator, then the synchro device 10, 11 will move the magnetic compass dial or indicator to the heading of the simulated aircraft in accordance with the positioning of the heading shaft. However, with this invention present in the simulator, wiper arm 35 picks off a scaled voltage in its position as there shown, which voltage is applied to amplifier 14 through conductor 38 and scaling resistor 15 to drive motor 13, which in turn drives shaft 17 to move transmitter 11, and thereby move the magnetic compass dial a predetermined amount in accordance with the magnetic deviation; thus, the reading of the magnetic compass is the heading of the simulated aircraft as modified by the magnetic deviation. Shaft 17 also drives wiper 18 of potentiometer 19 until a voltage is picked off by wiper 18 and transmitted through resistor 16 to balance the input voltage from wiper 35; whereupon motor 13 stops and the magnetic deviation is held in that position. As simulated flight progresses, for example if the wiper 35 were to be moved in a vertical direction, it would cross from segment 27 to segment 28 thereby picking off a different voltage and causing motor 13 to turn in accordance with the unbalance between input voltages to the amplifier, shaft 17 would therefore turn to the new position yielding a new magnetic variation on the compass dial.

It will be understood that board 25 is typical of only one section of flight. In this case, the San Diego, California deviations were chosen to illustrate the operation of the device. Other pre-formed boards are normally kept available for change as plug-in units.

As a practical matter, it is desirable to have a highly-damped system so that when the wiper moves from one segment to another the deviation is introduced gradually and not abruptly, this, however, is within the ability of those skilled in the art.

The above-described invention makes it possible to introduce a very interesting problem into a simulator. If the instructor manually fails the gyro-compass and the trainee is required to navigate by magnetic compass only, then the deviation effect automatically introduced reveals to both student and instructor the pilot's facility in orienting himself when taking into account the magnetic deviation effects of the earth's surface.

While a preferred embodiment of my invention has been shown and described, it will be apparent that other adaptations and modifications may be made without departing from the scope of the following claims.

What is claimed is:
1. In a flight simulator of the type having a computer for providing data in the form of derived voltages representing the heading of an aircraft to turn a shaft to a position representing the heading and to drive a flight plotting board, the combination comprising a simulated magnetic compass, a synchro device to drive the compass from the shaft, means driven from the plotting board for deriving voltages representing the deviation between magnetic north and true north, and a servo system connected between the said last means and the synchro device to apply thereto a rotation representing the magnetic deviation, said means for deriving voltages representing the deviation between magnetic north and true north comprising a planar member having a plurality of conductive segments mutually insulated, means to apply to each respective segment a predetermined potential corresponding to a magnetic deviation and a wiper movable on said member and connected to the plotting board.

2. The invention as set forth in claim 1 wherein the said means to apply a predetermined potential to the said segments comprises a potential divider.

3. The invention as set forth in claim 2 wherein the servo system comprises an amplified connected to said wiper, and a motor connected to the output of said amplifier and having a shaft connected to the synchro device.

4. The invention as set forth in claim 2 wherein the said segments are physically shaped to represent a geographical area of a given magnetic deviation value.

5. In a flight simulator having a heading computer and means to operate a magnetic compass, automatic magnetic deviation simulation apparatus comprising a plotting surface having a plurality of conductive segments each shaped to represent a geographical area of a given magnetic deviation value, each segment being electrically insulated from the other segments, means for providing a plurality of voltage values, means for applying each voltage to one of the said segments, and a servo system connected to the magnetic compass operating means and to the plotting surface whereby the magnetic compass indicates the aircraft heading as affected by magnetic deviation.

References Cited in the file of this patent
UNITED STATES PATENTS

| | | |
|---|---|---|
| 2,308,566 | Noxon | Jan. 19, 1943 |
| 2,445,673 | Kail | July 20, 1948 |
| 2,506,998 | Dehmel | May 9, 1950 |
| 2,796,681 | Ringham et al. | June 25, 1957 |